US 12,259,695 B2

United States Patent
Hein et al.

(10) Patent No.: US 12,259,695 B2
(45) Date of Patent: Mar. 25, 2025

(54) CONTROLLER FOR CONTROLLING A TECHNICAL SYSTEM, AND METHOD FOR CONFIGURING THE CONTROLLER

(71) Applicant: Siemens Aktiengesellschaft, Munich (DE)

(72) Inventors: Daniel Hein, Munich (DE); Holger Schöner, Munich (DE); Marc Christian Weber, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 457 days.

(21) Appl. No.: 17/784,269

(22) PCT Filed: Dec. 1, 2020

(86) PCT No.: PCT/EP2020/084025
§ 371 (c)(1),
(2) Date: Jun. 10, 2022

(87) PCT Pub. No.: WO2021/121946
PCT Pub. Date: Jun. 24, 2021

(65) Prior Publication Data
US 2023/0067320 A1 Mar. 2, 2023

(30) Foreign Application Priority Data
Dec. 18, 2019 (EP) .................................... 19217606

(51) Int. Cl.
*G05B 13/02* (2006.01)
*G05B 13/04* (2006.01)
(52) U.S. Cl.
CPC ......... *G05B 13/027* (2013.01); *G05B 13/041* (2013.01); *G05B 13/048* (2013.01)
(58) Field of Classification Search
None
See application file for complete search history.

(56) References Cited

U.S. PATENT DOCUMENTS

| 10,338,542 B2 | 7/2019 | Dull et al. |
| 10,983,485 B2 | 4/2021 | Hentschel et al. |

(Continued)

FOREIGN PATENT DOCUMENTS

| CA | 2714619 A1 | 3/2011 |
| CN | 106716455 A | 5/2017 |

(Continued)

OTHER PUBLICATIONS

Saurav Kaushik: "Introduction to Feature Selection methods with an example (or how to select the right variables?)"; Internet Citation, Dec. 1, 2016; XP002787063; Retrieved from the Internet: URL:https://www.analyticsvidhya.com/blog/2016/12/introduction-tofeature-selection-methods-with-an-example-or-how-to-select-theright-variables/.

(Continued)

*Primary Examiner* — Sean Shechtman
(74) *Attorney, Agent, or Firm* — Schmeiser, Olsen & Watts, LLP

(57) ABSTRACT

A controller for a technical system is trained using a machine learning method. For this purpose, a chronological sequence of training data is detected for the machine learning method, the training data including both state data as well as control action data of the technical system. A change in the control action data over time is detected specifically and correlated with changes in the state data over time within different time windows, wherein a time window-specific correlation value is ascertained in each case. A resulting time window is then ascertained on the basis of the ascertained correlation values, and the training data which is found within the resulting time window is extracted in a time window-specific manner. The controller is trained by means of the machine learning method using the extracted training data and thereby configured to control the technical system.

15 Claims, 2 Drawing Sheets

(56) References Cited

U.S. PATENT DOCUMENTS

| | | |
|---|---|---|
| 11,340,564 B2 | 5/2022 | Hentschel et al. |
| 2014/0100703 A1 | 4/2014 | Dull et al. |
| 2021/0256428 A1 | 8/2021 | Dull et al. |

FOREIGN PATENT DOCUMENTS

| | | |
|---|---|---|
| DE | 102014212747 A1 | 1/2016 |
| DE | 102016224207 A1 | 6/2018 |
| DE | 102017205713 A1 | 10/2018 |
| DE | 102017216634 A1 | 3/2019 |
| EP | 3588211 A1 | 1/2020 |
| JP | 2014525063 A | 9/2014 |
| KR | 101687169 B1 | 12/2016 |
| WO | 2019184836 A1 | 10/2019 |

OTHER PUBLICATIONS

PCT International Search Report and Written Opinion of International Searching Authority mailed Mar. 16, 2021 corresponding to PCT International Application No. PCT/EP2020/084025 filed Jan. 12, 2020.

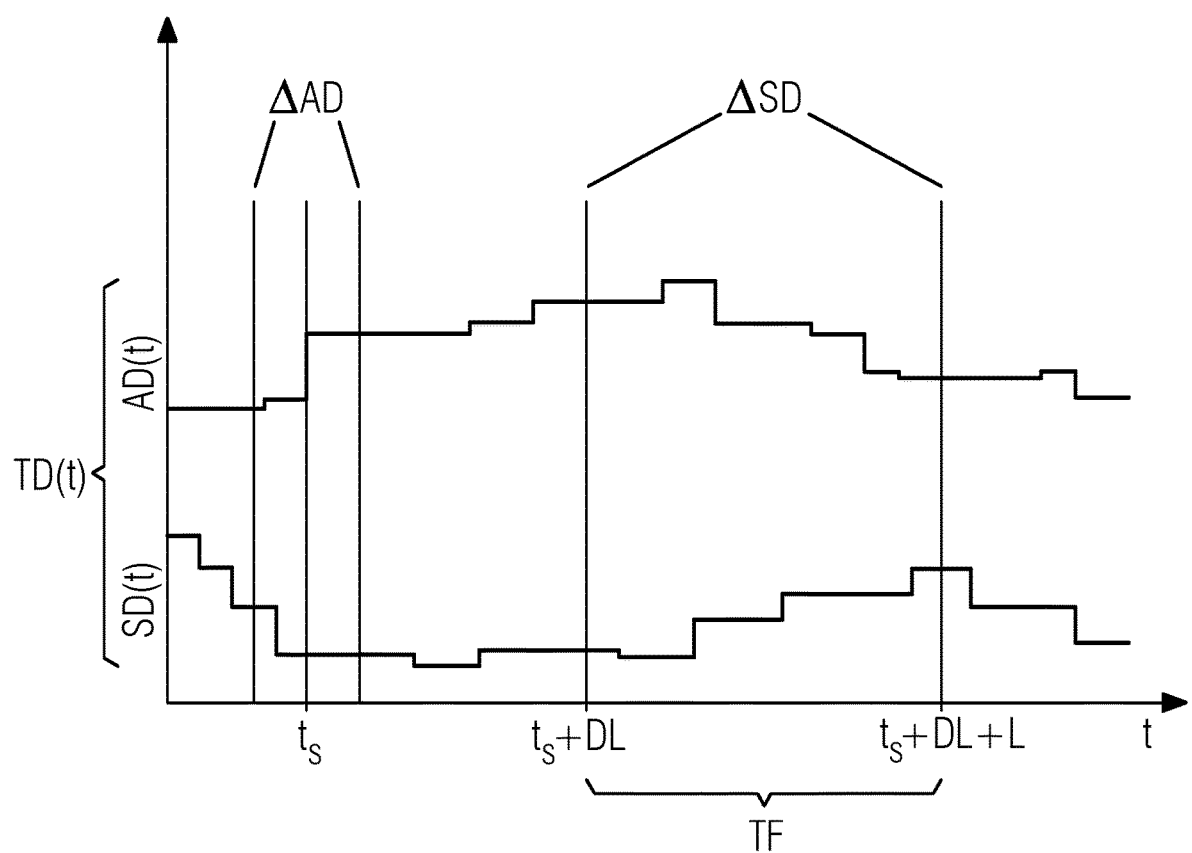

CONTROLLER FOR CONTROLLING A TECHNICAL SYSTEM, AND METHOD FOR CONFIGURING THE CONTROLLER

CROSS-REFERENCE TO RELATED APPLICATIONS

This application claims priority to PCT Application No. PCT/EP2020/084025, having a filing date of Dec. 1, 2020, which claims priority to EP Application No. 19217606.3, having a filing date of Dec. 18, 2019, the entire contents both of which are hereby incorporated by reference.

FIELD OF TECHNOLOGY

The following relates to a controller for controlling a technical system, and a method for configuring the controller.

BACKGROUND

Complex technical systems such as e.g. gas turbines, wind turbines, internal combustion engines, robots, production plants, motor vehicles or electricity grids usually require a sophisticated configuration for productive operation, for example in order to specifically optimize a return, a resource requirement, an efficiency, an emission of pollutants, a level of wear and/or other target parameters of the technical system.

Contemporary control devices of technical systems frequently use machine learning methods for configuration. Such learning methods can be used to train a control device, on the basis of training data, to ascertain from current operating data of the technical system those control actions for controlling the technical system that specifically cause a desired or otherwise optimum behavior in the technical system. A multiplicity of known learning methods are available for these purposes, such as e.g. reinforcement learning methods. The training data used can be in particular historical and/or current operating data of the technical system or of similar technical systems.

Known learning methods usually require a large volume of training data for successful training, which training data should moreover cover the operating conditions of the technical system as representatively as possible. Too small a volume of representative training data or too little coverage of relevant operating conditions can adversely affect the success of training.

SUMMARY

An aspect relates to specifying a control device for controlling a technical system and a method for configuring the control device that permit more efficient training.

To configure a control device for a technical system by means of a machine learning method, a temporal sequence of training data for the machine learning method is captured. The training data in this instance comprise state data specifying states of the technical system and control action data specifying control actions of the technical system. The technical system may comprise in particular a gas turbine, a wind turbine, a solar power plant, a power station, an internal combustion engine, a robot, a production plant, a motor vehicle, a traffic control system, an energy control unit for a building, a power transmission system, a 3D printer or another machine. According to embodiments of the invention, a change in the control action data over time is specifically captured and is correlated with changes in the state data over time within different time windows, wherein a time-window-specific correlation value is ascertained in each case. A resulting time window is then ascertained on the basis of the ascertained correlation values, and the training data situated within the resulting time window are extracted on a time-window-specific basis. The control device is then trained on the basis of the extracted training data by means of the machine learning method and thus configured to control the technical system.

To carry out the method according to embodiments of the invention there is provision for a control device, a computer program product (non-transitory computer readable storage medium having instructions, which when executed by a processor, perform actions), and a non-volatile computer-readable storage medium.

The method according to embodiments of the invention and the control device according to embodiments of the invention can be carried out or implemented by means of one or more computers, processors, application-specific integrated circuits (ASICs), digital signal processors (DSPs) and/or what are known as field-programmable gate arrays (FPGAs), for example.

If a resulting time window is specifically ascertained such that changes in state data contained therein over time correlate with changes in control action data over time, it can be expected that the training data contained in the resulting time window contain an above-average amount of information about effects of control interventions on states of the technical system. It turns out that specific extraction and use of training data situated within the resulting time window often allow causal relationships between control interventions and the effects thereof to be learned considerably more quickly and more efficiently. Contrary to a popular school of thought, in many cases it can be observed that training restricted to specifically selected training data is more efficient than training using all available training data. Less relevant or redundant training data can often even reduce the success of training.

According to one advantageous embodiment of the invention, the correlation values for different time windows may be compared. On the basis of this, a time window which is optimized with respect to the correlation values can be ascertained as the resulting time window. In particular, a time window having a correlation value indicating maximum correlation or maximum anti-correlation can be selected as the resulting time window. Alternatively or additionally, the resulting time window can be ascertained by combining different time windows with increased or particularly high correlation or anti-correlation.

According to a further advantageous embodiment of the invention, a multiplicity of different time windows can be generated, wherein the generation is controlled by means of a numerical optimization method in such a manner that a respective correlation value of the generated time windows is optimized. This makes it possible to obtain training data which are particularly highly correlated and generally prove to be particularly beneficial for training.

A gradient descent method, particle swarm optimization and/or a genetic optimization method can be used as the optimization method in embodiments. A multiplicity of implementations are available for the above optimization methods.

According to a further advantageous embodiment of the invention, the control action data may comprise action components specifying different control actions. The change in the control action data over time may then be specifically captured for a respective action component, and the correlation values can be specifically ascertained for a respective action component. On the basis of this, the resulting time window can be ascertained by combining action-component-specific time windows. In particular, highly correlated action-component-specific time windows can be combined for this purpose by means of action-component-specific weights.

Furthermore, the state data may comprise state components specifying different state parameters of the technical system. The correlation values can then be specifically ascertained for a respective state component. On the basis of this, the resulting time window can be ascertained by combining state-component-specific time windows. In particular, highly correlated state-component-specific time windows can be combined for this purpose by means of state-component-specific weights.

In embodiments, a multiplicity of changes in the control action data over time can be captured and can each be correlated with a multiplicity of changes in the state data over time using different time windows defined relative to the respective change in the control action data over time, wherein a time-window-specific correlation value is ascertained in each case. This makes it possible to generally considerably increase a statistical significance of the ascertained correlation values.

According to a further advantageous embodiment of the invention, the resulting time window can be ascertained by means of a combination, an average and/or another, in particular weighted, combination of different time windows. Action-component-specific and/or state-component-specific weights can be used for weighting, in particular. This makes it possible to ascertain resulting time windows which have a strong correlation for all or at least for a majority of action components and/or state components.

According to one advantageous development of embodiments of the invention, the state data and/or the control action data can be aggregated using an aggregation time window. The resulting time window can then be ascertained on the basis of the aggregated state data and/or the aggregated control action data. Such aggregation makes it possible to combine and/or reduce state data and/or control action data over time, for example by continually forming possibly weighted mean values, medians, maxima, minima and/or other combinations of a plurality of temporally successive state data and/or control action data. This makes it possible to at least partially compensate for random or anomalous fluctuations in the state data and/or control action data, which could otherwise make it difficult to detect cause-effect relationships.

Different aggregation time windows can be used in embodiments, and the correlation values can be specifically ascertained for a respective aggregation time window. On the basis of this, an aggregation time window which is optimized with respect to the correlation values can be ascertained and used.

According to a further advantageous embodiment of the invention, training data situated outside the resulting time window can be suppressed or rejected when training the control device. Alternatively or additionally, the training data situated outside the resulting time window can be given a lower weighting than the extracted training data during training.

BRIEF DESCRIPTION

Some of the embodiments will be described in detail, with reference to the following figures, wherein like designations denote like members, wherein:

FIG. 3 shows a graph containing training data plotted against time.

DETAILED DESCRIPTION

Figure 1:
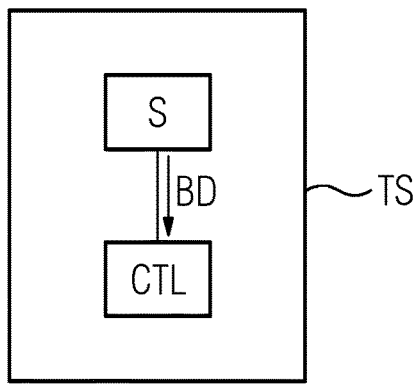
FIG. 1 shows a gas turbine having a control device according to embodiments of the invention.

FIG. 1 provides an illustrative visualization of a gas turbine as a technical system TS. Alternatively or additionally, the technical system TS can also comprise a wind turbine, a solar power plant, a power station, an internal combustion engine, a robot, a production plant, a motor vehicle, a traffic control system, an energy control unit for a building, a power transmission system, a 3D printer or another machine.

The gas turbine TS is coupled to a control device CTL, which is trainable in computer-aided fashion and which may be implemented as part of the gas turbine TS or wholly or in part externally to the gas turbine TS. The control device CTL is used to control the technical system TS and, for this purpose, is trainable by means of a machine learning method. Control of the technical system TS will also be understood in this instance to mean regulation of the technical system TS and output and use of control-relevant data and control signals, i.e. data and control signals that contribute to controlling the technical system TS.

Control-relevant data of this kind can comprise in particular control action data, forecast data, monitoring data and/or classification data, which can be used in particular for optimizing operation of, monitoring or maintaining the technical system TS and/or for detecting wear or damage.

The gas turbine TS moreover has sensors S which are coupled to the control device CTL and continually measure one or more operating parameters of the technical system TS and transmit them to the control device CTL in the form of operating data BD. Besides the sensor data, the control device CTL can also capture further operating parameters from other data sources of the technical system TS or from external data sources.

The operating data BD can be understood here and below to mean in particular physical, control-oriented, operative and/or design-dependent operating variables, property data, performance data, effect data, state data, system data, stipulated values, control data, sensor data, measured values, environmental data, monitoring data, forecast data, analysis data and/or other data obtained during operation of the technical system TS and/or describing an operating state or a control action of the technical system TS. These can be e.g. data about temperature, pressure, emissions, vibrations, oscillation states or resource consumption of the technical system TS. Specifically in the case of a gas turbine, the operating data BD can relate to a turbine output, a rotation speed, vibration frequencies or vibration amplitudes. The operating data BD may be scalar, vector-valued or tensor-valued and in particular highly dimensional.

Figure 2:
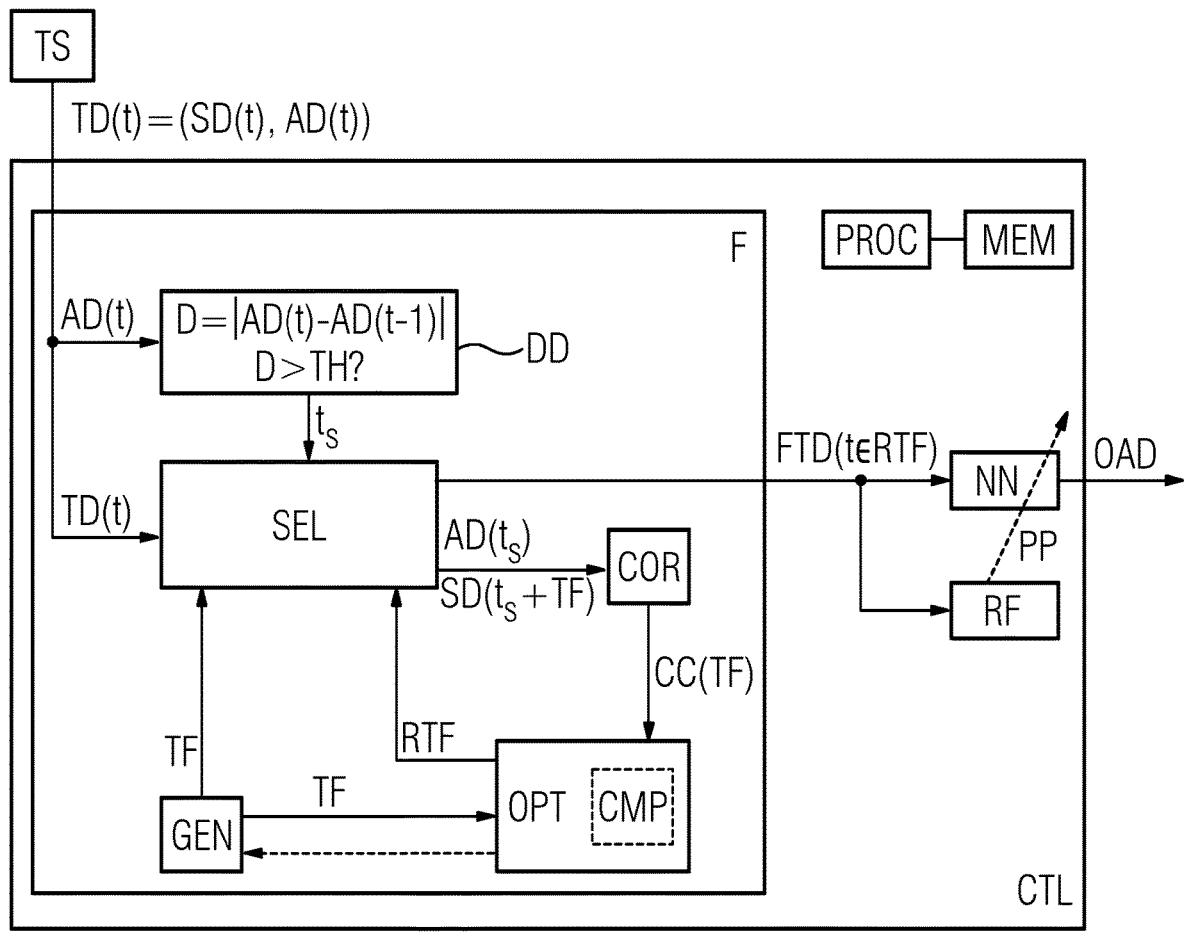
FIG. 2 shows a control device according to embodiments of the invention in a training phase.

FIG. 2 shows a schematic depiction of a control device CTL according to embodiments of the invention in a training phase, which configures the control device CTL for optimized control of a technical system TS. The control device CTL is coupled to the technical system TS.

The control device CTL and the technical system TS may be designed or implemented as described in conjunction with FIG. 1. The control device CTL has one or more processors PROC for carrying out all of the method steps of the control device CTL and has one or more memories MEM, coupled to the processor PROC, for storing the data to be processed by the control device CTL.

The technical system TS captures a temporal sequence of operating data, which comprise both state data and control action data, by sensor and transmits said temporal sequence as training data TD(t) to the control device CTL. Here and below, t denotes a temporal dependency of a respective variable or the association thereof with a respective time t.

The temporal sequence of the training data TD(t) comes from the technical system TS in the present exemplary embodiment. In general, however, the training data used can be any historical, current and/or simulated operating data of the technical system TS or of similar technical systems that can be used for training.

The training data TD(t) contain in particular a temporal sequence of state data SD(t) and a temporal sequence of control action data AD(t). The state data SD(t) in this instance specify operating states of the technical system TS, while the control action data AD(t) specify control actions performed on the technical system TS. The operating states can relate to a power, a rotation speed, a temperature, a pressure, an oscillation state and/or an emission of the technical system TS, for example.

The control device CTL has a data-driven trainable arithmetic module NN that implements a machine learning method. In the present exemplary embodiment, the trainable arithmetic module NN has an artificial neural network by means of which a reinforcement learning method is implemented. A trainable arithmetic module of this kind or an appropriately trained control device is frequently also referred to as a trainable or learning policy agent or as a control model. The neural network of the arithmetic module NN has a training structure that develops during training.

Training will generally be understood to mean optimization of a mapping of input parameters of a parameterized system model, e.g. of a neural network, onto one or more output parameters. This mapping is optimized according to stipulated, learned and/or learnable criteria during a training phase. The criterion used, e.g. in the case of control models, can be a success of control actions, which can relate to e.g. a return, a resource requirement, an emission of pollutants, a level of wear or another parameter that quantifies a performance of the technical system. A training structure can comprise e.g. a networking structure of neurons of a neural network and/or weights of connections between the neurons, which are developed by the training such that the criteria are satisfied as well as possible.

In the present exemplary embodiment, the arithmetic module NN is trained by means of a reinforcement learning method to control the technical system TS in optimized fashion. This involves the arithmetic module NN being trained to take operating data of the technical system TS that are supplied as input parameters as a basis for outputting optimized control action data OAD as output parameters which-when applied to the technical system TS-optimize a target function RF. A multiplicity of known standard routines are available for such learning methods.

The target function RF uses supplied operating data to calculate a performance parameter PP that can be optimized by said learning method. For this purpose, the values of the performance parameter PP that are calculated by the target function RF are supplied to the arithmetic module NN, as indicated by a dashed arrow in FIG. 2. Therefore, the training structure of the neural network is adapted by means of the learning method such that the output parameters OAD of the neural network optimize the performance parameter PP.

The performance parameter PP quantifies a desired behavior of the technical system TS. As such, the performance parameter PP used can be for example a possibly weighted combination of return, yield, efficiency, emission of pollutants, level of wear and resource consumption of the technical system TS or of a part thereof or another parameter relating to a performance of the technical system TS. By optimizing the performance parameter PP, the arithmetic module NN is trained to output optimized control action data OAD and in this way the control device CTL is configured for optimized control of the technical system TS.

A target function, in this instance RF, for calculating a performance parameter, in this instance PP, is frequently also referred to as a reward function or cost function. In embodiments, the performance parameter indicates a long-term, cumulative or discounted gain or an overall reward.

The operating data used in the target function RF are frequently also referred to as target data and are usually part of the state data of the technical system TS that are contained in the operating data. A multiplicity of methods are known for calculating performance parameters from target data of the technical system TS.

It turns out that the training success of the arithmetic module NN is substantially dependent on the quality of the training data TD. With this in mind, it is an aim according to embodiments of the invention to strive to find and extract those training data that are particularly useful for training or for training success.

In order to select and extract these training data that are beneficial for training, the control device CTL contains a filter F to which the training data TD(t) are transmitted. The filter F is used to identify time intervals or time windows that may contain training data beneficial for training and to specifically extract or filter out these training data that are beneficial for training.

It turns out that those training data that contain information about effects of control interventions on states of the technical system TS are particularly beneficial for training. Focusing the learning method on such training data usually allows interrelationships between control interventions and the effects thereof to be learned considerably more quickly and more efficiently. It is therefore found to be advantageous to identify those time windows in which control actions are applied or change, i.e. in which control actions change over time.

In order to detect a change in the control actions over time, the filter F comprises a change detector DD to which the temporal sequence of the control action data AD(t) is transmitted. To this end, the control action data AD(t) are specifically extracted from the training data TD(t) by the filter F.

In order to detect the change in the control action data AD(t) over time, the change detector DD continually ascertains a measure of change D. The latter can be calculated for example as the absolute value of a difference between successive control action data $|AD(t)-AD(t-1)|$ or as the square of such a difference $(AD(t)-AD(t-1))^2$. In the case of control action data AD(t) having a plurality of action components, correspondingly multidimensional Euclidean or weighted distances between successive control action vectors can be ascertained as the measure of change D. In particular, in order to ascertain their change over time, the control action data AD(t) can be aggregated using an aggregation time window, for example by continually forming sliding mean values. The measure of change D can then be determined, for example, by an absolute value or a square of a difference between successive mean values of control action data. This makes it possible to at least partially compensate for anomalous or random fluctuations in the control action data AD(t).

The change detector DD compares the continually ascertained measures of change D with a stipulated or otherwise determined threshold value TH and detects a change in the control action data AD(t) over time as a result of this threshold value TH being exceeded. In the case of multicomponent control action data, there may be provision for accordingly component-specific threshold values. Alternatively or additionally, the change detector DD can search the sequence of the control action data AD(t) for a stipulated or otherwise determined change pattern and detect a change in the control action data AD(t) over time as a result of this change pattern occurring.

A respective point of change in the sequence of the control action data AD(t) is ascertained as a result of a respective change being detected. In the present exemplary embodiment, the respective point of change ascertained is a respective change time $t_s$ at which the threshold value TH is exceeded by the respective measure of change D.

The ascertained change times $t_s$ are transmitted from the change detector DD to a selection module SEL of the filter F. This selection module SEL also has the training data TD(t), i.e. the control action data AD(t) and the state data SD(t), transmitted to it.

The selection module SEL takes the change times $t_s$ as a basis for respectively specifically selecting and extracting those of the control action data AD(t) which are present at or around a respective change time $t_s$. These control action data are also referred to as AD($t_s$) for short below.

The filter F also has a time window generator GEN for generating a multiplicity of time windows TF. These may each be specified, in particular, by one or more time intervals. The latter may each be quantified by a starting time and an end time or by a time and an interval length. In this case, the time intervals may be stated in absolute terms or relative to a change time or another event. In the present exemplary embodiment, the time windows are defined relative to a respective change time $t_s$.

The generated time windows TF are transmitted from the time window generator GEN to the selection module SEL. The selection module SEL takes the transmitted time windows TF as a basis for respectively specifically selecting and extracting those of the state data SD(t) which are situated relative to the respective change time $t_s$ within these time windows TF. For a time window TF=[DL, DL+L] with a starting time DL indicated relative to the change time $t_s$ and an interval length L, the extracted state data may be given, for example, by a set {SD($t_s$+DL), . . . , SD($t_s$+DL+L)} or generally as {SD(t): t−$t_s$∈TF}. The relative starting time DL can be interpreted here as it were as a delay time with respect to the change time $t_s$. The state data extracted for a respective change time $t_s$ and a respective time window TF are also referred to as SD($t_s$+TF) for short below.

The extracted control action data AD($t_s$) are transmitted, together with the extracted state data SD($t_s$+TF), by the selection module SEL to a correlation module COR of the filter F. The correlation module COR takes the extracted control action data AD($t_s$) as a basis for quantifying a change ΔAD in the control action data AD(t) over time at or around the respective change time $t_s$. This can be carried out, for example, by forming a difference according to ΔAD=AD($t_s$+1)−AD($t_s$−1), where 1 is a predefined short period. If, for the purpose of ascertaining their change over time, the control action data AD(t) are aggregated using an aggregation time window, their change ΔAD over time can be similarly determined by forming a difference between successive aggregated values of control action data. In the case of multicomponent control action data AD(t), a plurality of change components ΔAD may be accordingly quantified in each case, as described above.

Furthermore, the correlation module COR takes the extracted state data SD($t_s$+TF) as a basis for quantifying their change ΔSD over time within the respective time window TF. This can be carried out, for example, by forming a difference according to ΔSD=SD($t_s$+DL+L)−SD($t_s$+DL). If, for the purpose of determining their change over time, the state data SD(t) are aggregated using an aggregation time window, their change ΔSD over time can be similarly determined by forming a difference between successive aggregated values of state data. In the case of multicomponent state data SD(t), a plurality of change components ΔSD may be accordingly quantified in each case, as described above.

The use of a respective time window TF is illustrated further with reference to FIG. 3. FIG. 3 shows a graph in which a sequence of training data TD(t) is plotted against time t. The training data TD(t) comprise state data SD(t), which are illustrated in the lower part of the graph, and control action data AD(t), which are illustrated in the top part. For reasons of clarity, only a characteristic for a single value is depicted in highly simplified fashion in each case.

The temporal sequence of the control action data AD(t) is shown by multiple changes over time. For the present exemplary embodiment, it is assumed that an ascertained measure of change D exceeds a threshold value TH within the illustrated time interval only at the change time $t_s$. A change ΔAD in the control action data AD(t) over time is therefore detected only at or around the change time $t_s$ in this time interval. Consequently, a change ΔSD in the state data SD(t) over time is ascertained within a time window TF defined relative to the change time $t_s$. In this case, the beginning of the time window TF has been shifted by a delay time DL with respect to the detected change time $t_s$. The end of the time window TF is accordingly defined by its length L.

The further course of the method according to embodiments of the invention is illustrated again with reference to FIG. 2.

According to embodiments of the invention, for a multiplicity of different time windows TF, the correlation module COR correlates the changes ΔAD in the control action data over time with the changes ΔSD in the state data over time in the respective time window TF. The correlation is respectively formed over a multiplicity of detected change times $t_s$. A correlation sum, a correlation integral and/or a correlation coefficient, for example, can be calculated for this purpose using standard numerical methods in order to obtain a numerical correlation value.

In the present exemplary embodiment, for each of the time windows TF, a correlation value CC(TF) specific to this time window TF is thus ascertained. The correlation values CC(TF) are transmitted from the correlation module COR to an optimization module OPT of the filter F. In addition, the time windows TF are also transmitted from the time window generator GEN to the optimization module OPT.

The optimization module OPT compares the correlation values CC(TF) ascertained for the different time windows TF using a comparator CMP and thus ascertains one or more of the time windows TF in which the changes ΔSD in the state data over time have a high or maximum correlation or a high or maximum anti-correlation with the changes ΔAD in the control action data over time. In addition, the optimization module OPT specifically varies parameters of the time windows TF on the basis of the correlation values CC(TF) in order to find a time window which is optimized with respect to the correlation values CC(TF). In embodiments, the time window generator GEN is controlled by the optimization module OPT in such a manner that a respective correlation value CC(TF) of the generated time windows TF is optimized. Particle swarm optimization, a gradient descent method and/or a genetic optimization method may be used for this purpose in embodiments.

If the control action data AD(t) and/or the state data SD(t) are aggregated using an aggregation time window, a length or a position of a respective aggregation time window can likewise be optimized by the optimization module OPT in order to ascertain an aggregation time window which is optimized with respect to the correlation values CC(TF) and to use it in the further method.

The optimization module OPT takes the correlation-optimizing time windows as a basis for ascertaining one or more resulting time windows RTF in which the changes $\Delta$SD in the state data over time have a particularly strong correlation with the changes $\Delta$AD in the control action data over time. The resulting time windows RTF may be ascertained, in particular, by means of an average, a combination and/or another, in particular weighted, combination of different time windows TF. Action-component-specific and/or state-component-specific weights can be used for weighting, in particular. This makes it possible to ascertain resulting time windows RTF, the state data $SD(t_s+RTF)$ of which have a strong correlation for all or at least for a majority of action components and/or state components. The resulting time windows RTF are transmitted by the optimization module OPT to the selection module SEL.

On the basis of the resulting time windows RTF, the selection module SEL specifically selects and extracts those of the training data TD(t) that are situated within these resulting time windows RTF. These training data situated within the resulting time windows RTF are subsequently referred to as extracted or filtered training data FTD. For a resulting time window RTF=$[t_1, t_2]$ with a starting time $t_1$ and an end time $t_2$, the extracted training data may be given by FTD=$\{TD(t_1), \ldots, TD(t_2)\}$ or generally as FTD=$\{TD(t): t \in RTF\}$, for example.

The training data FTD selected and filtered on a time-window-specific basis are transmitted from the selection module SEL or from the filter F to the arithmetic module NN. Furthermore, the filtered training data FTD are supplied to the target function RF, which calculates the performance parameter PP from the operating data contained in the extracted training data FTD and in particular from state data contained in said operating data. On the basis of the extracted training data FTD and the calculated performance parameter PP, the neural network of the arithmetic module NN is trained, as already indicated above, such that control action data OAD are output that—when applied to the technical system TS—optimize the performance parameter PP.

In the present exemplary embodiment, no training data situated outside the resulting time windows RTF are supplied to the arithmetic module NN and the neural network is thus trained exclusively on the basis of the extracted training data FTD. As already mentioned above, in particular a reinforcement learning method may be implemented in the arithmetic module NN as an alternative or in addition to the neural network.

Alternatively, training data situated outside the resulting time windows RTF can also be supplied to the arithmetic module NN. In this case, the arithmetic module NN can be trained at least preferably or predominantly on the basis of the filtered training data FTD. As such, the filtered training data FTD can be provided with a higher weighting during training than the training data situated outside the resulting time windows RTF, or the latter training data can be reduced, thinned out and/or in some cases rejected.

In embodiments, it is possible for continually and currently captured training data TD(t) to be continually filtered by the filter F and for the control device CTL to continue to be trained on the basis of the filtered training data FTD in the course of operation.

As a result of the neural network and hence the arithmetic module NN being trained, the control device CTL is configured for optimized control of the technical system TS. For control, the control device CTL applies the control strategy learned from the training, i.e. maps current system states onto control actions or control action data OAD that are optimum in terms of the target function RF.

The specific filtering of the training data means that the arithmetic module NN is trained by means of training data that are particularly beneficial for training. These selected training data FTD contain a particularly large number of correlations between control interventions and the effects thereof on system states of the technical system TS and are therefore particularly representative of the control of said technical system. The specific selection of the training data can effectively prevent redundant, less relevant or less significant information from disrupting or slowing down the learning process. It is evident that embodiments of the invention's filtering of the training data can significantly improve training success and can significantly reduce training effort.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for configuring a control device for a technical system using a machine learning method, the method for configuring the control device comprising:
   a) a temporal sequence of training data for the machine learning method is captured, wherein the training data comprise state data specifying states of the technical system and control action data specifying control actions of the technical system,
   b) a change in the control action data over time is specifically captured,
   c) the change in the control action data over time is correlated with changes in the state data over time within different time windows, wherein a time-window-specific correlation value is ascertained in each case,
   d) a resulting time window is ascertained on the basis of the ascertained correlation values,
   e) the training data situated within the resulting time window are extracted on a time-window-specific basis, and f) the control device is trained on the basis of the extracted training data using the machine learning method and is therefore configured to optimize control of the technical system.

2. The method as claimed in claim 1, wherein the technical system comprises a gas turbine, a wind turbine, a solar power plant, a power station, an internal combustion engine, a robot, a production plant, a motor vehicle, a traffic control system, an energy control unit for a building, a power transmission system, a 3D printer, or another machine.

3. The method as claimed in claim 1,
wherein respective correlation values for different time windows are compared, and
wherein a time window which is optimized with respect to the respective correlation values is ascertained as the resulting time window.

4. The method as claimed in claim 1,
wherein a multiplicity of different time windows are generated, wherein the generation is controlled by means of an optimization method in such a manner that a respective correlation value of the generated time windows is optimized.

5. The method as claimed in claim 4,
wherein a gradient descent method, particle swarm optimization and/or a genetic optimization method is used as the optimization method.

6. The method as claimed in claim 1,
wherein the control action data comprise action components specifying different control actions,
wherein the change in the control action data over time is specifically captured for a respective action component,
wherein the correlation values are specifically ascertained for a respective action component, and
wherein the resulting time window is ascertained by combining action-component-specific time windows.

7. The method as claimed claim 1,
wherein the state data comprise state components specifying different state parameters of the technical system,
wherein the correlation values are specifically ascertained for a respective state component, and
wherein the resulting time window is ascertained by combining state-component-specific time windows.

8. The method as claimed in claim 1,
wherein a multiplicity of changes in the control action data over time are captured and are each correlated with a multiplicity of changes in the state data over time using different time windows defined relative to the respective change in the control action data over time, wherein a time-window-specific correlation value is ascertained in each case.

9. The method as claimed in claim 1,
wherein the resulting time window is ascertained by means of a combination, an average and/or another combination of different time windows.

10. The method as claimed in claim 1,
wherein the state data and/or the control action data are aggregated using an aggregation time window, and
wherein the resulting time window is ascertained on the basis of the aggregated state data and/or the aggregated control action data.

11. The method as claimed in claim 10,
wherein different aggregation time windows are used,
wherein the correlation values are specifically ascertained for a respective aggregation time window, and
wherein an aggregation time window which is optimized with respect to the correlation values is ascertained and used.

12. The method as claimed in claim 1,
wherein training data situated outside the resulting time window are suppressed or rejected when training the control device.

13. The control device for controlling the technical system, designed to carry out the method as claimed in claim 1.

14. A computer program product, comprising a non-transitory computer readable hardware storage device having computer readable program code stored therein, said program code executable by a processor of a computer system to implement the method as claimed in claim 1.

15. A non-transitory computer-readable storage medium having the computer program product as claimed in claim 14.

* * * * *